Feb. 3, 1959 R. J. CASTEN 2,871,567
NAVIGATIONAL PLOTTING INSTRUMENT
Filed March 31, 1954 2 Sheets-Sheet 1
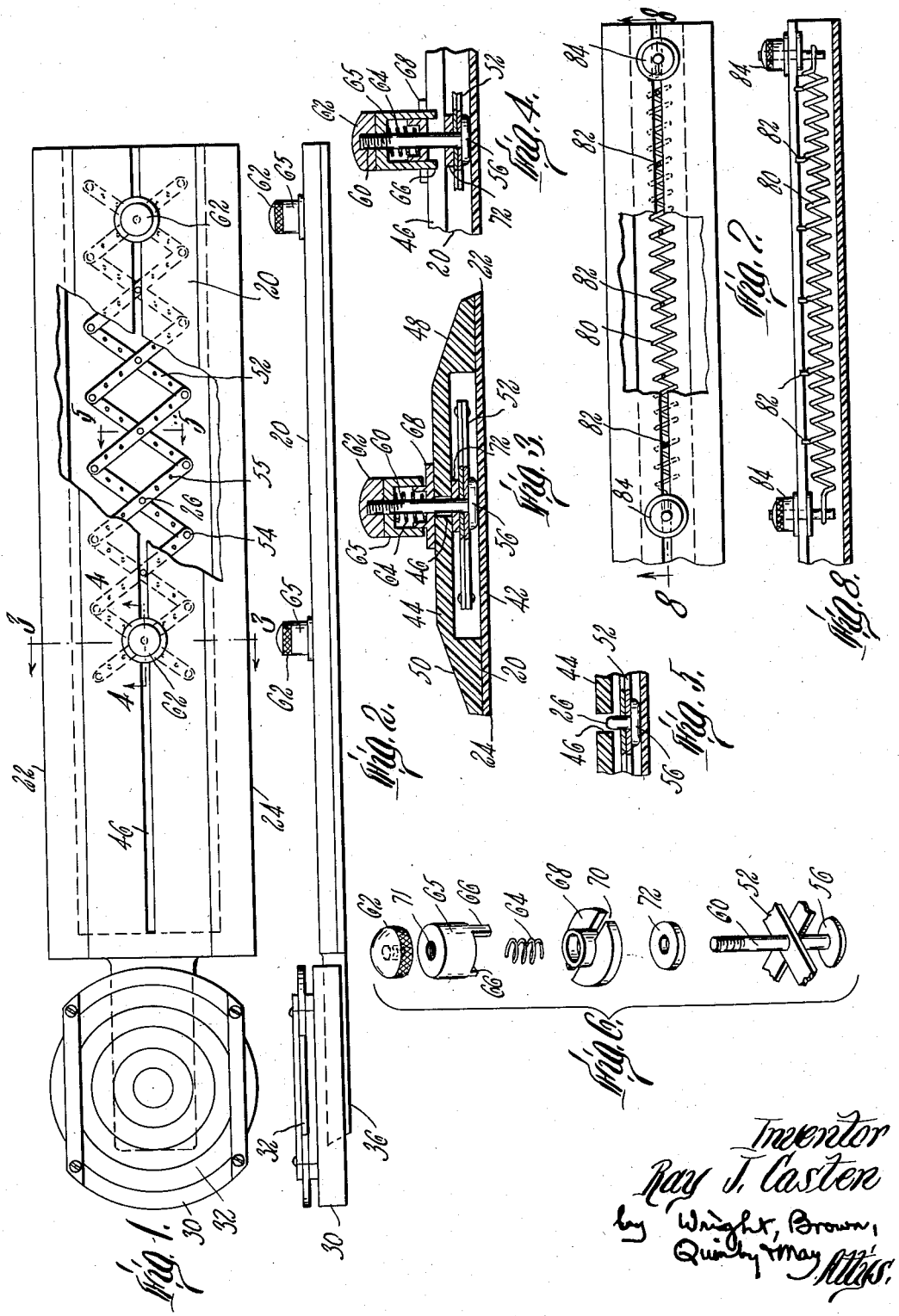
Inventor
Ray J. Casten Feb. 3, 1959  R. J. CASTEN  2,871,567
NAVIGATIONAL PLOTTING INSTRUMENT
Filed March 31. 1954  2 Sheets-Sheet 2
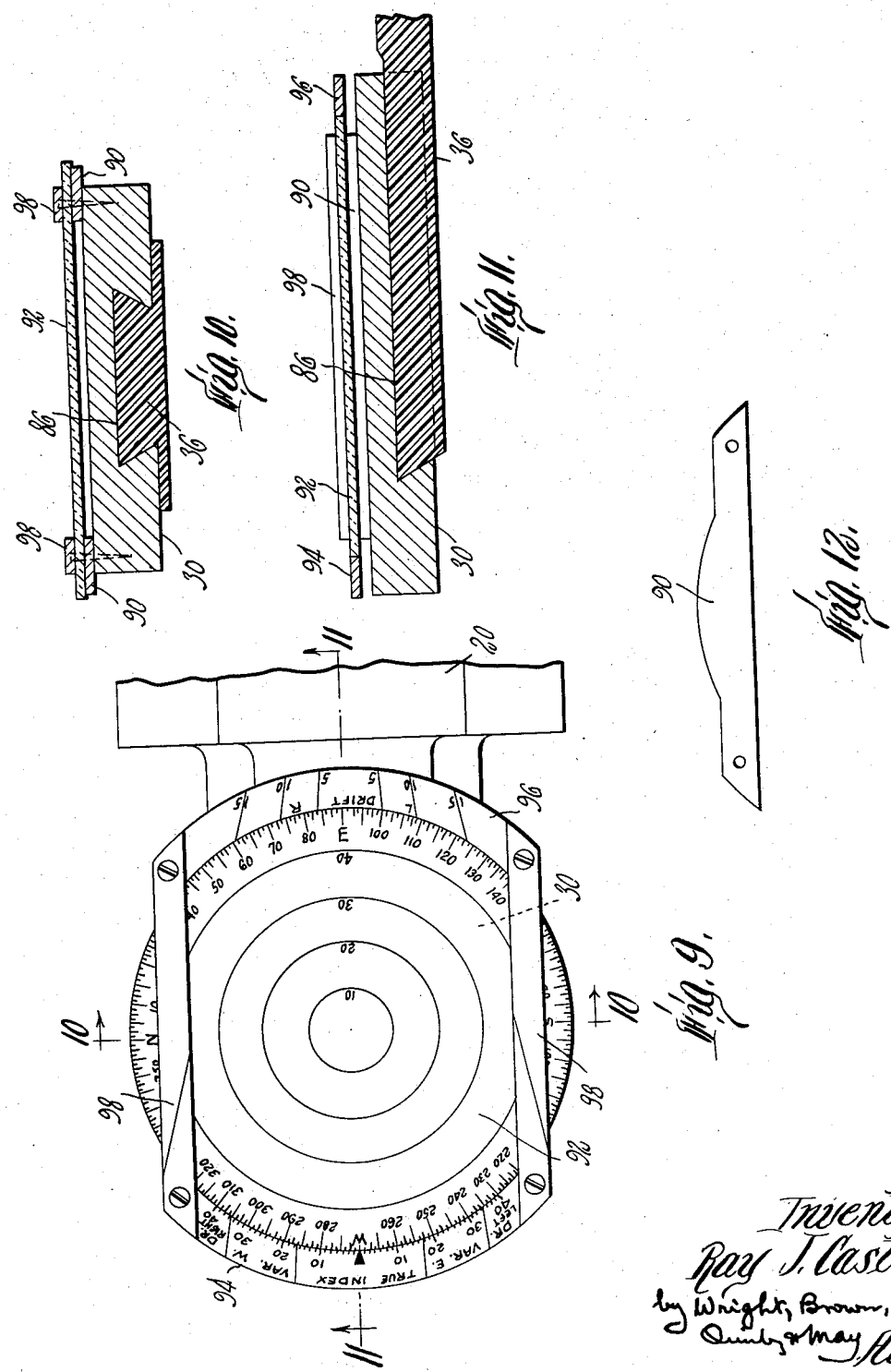
Inventor
Ray J. Casten

United States Patent Office 2,871,567
Patented Feb. 3, 1959

2,871,567

NAVIGATIONAL PLOTTING INSTRUMENT

Ray J. Casten, Natick, Mass.

Application March 31, 1954, Serial No. 420,154

2 Claims. (Cl. 33—75)

This invention relates to a plotting instrument for use on a chart (geographic or other) so as to facilitate the task of keeping constant track of the position of a ship or aeroplane, predicting future positions, locating landmarks and navigational aids, and providing information required for tactical problems and the like. One feature of the instrument is an adjustable scale which can quickly and easily be altered to correct errors or miscalculations of the speed of ship over the ground, for example.

An important feature of the invention may be embodied in a ruler having a series of uniformly spaced scale elements which are adjustable toward or from one another to vary the spacing while always maintaining the uniformity of the spacing. Various other advantageous features are disclosed in the following description of the invention and on the drawings, of which—

Figure 1 is a plan view of a navigational plotting instrument embodying the invention;

Figure 2 is a side elevation of the same;

Figure 3 is an enlarged sectional view on the line 3—3 of Figure 1;

Figure 4 is an enlarged sectional view on the line 4—4 of Figure 1;

Figure 5 is an enlarged sectional view on the line 5—5 of Figure 1;

Figure 6 is an exploded perspective view of a portion of the expanding scale mechanism;

Figure 7 is a fragmentary plan view of a modified form of the invention;

Figure 8 is a section on the line 8—8 of Figure 7;

Figure 9 is a plan view similar to a portion of Figure 1 but on a larger scale and in more detail;

Figure 10 is a section on the line 10—10 of Figure 9;

Figure 11 is a section on the line 11—11 of Figure 9; and

Figure 12 is a plan view of one of the parts of the apparatus.

A preferred embodiment of the invention is shown in Figure 1 and consists of a ruler 20 having parallel edges 22 and 24 and an expansible scale device which may be in the form of a lazy-tongs structure carrying a series of scale mark elements 26. These mark elements are arranged in a straight line parallel to the edges 22 and 24 and are uniformly spaced apart. The lazy-tongs can be manipulated to move the mark elements 26 toward or from one another while maintaining a uniformity of spacing between successive elements.

At one end of the ruler 20 is detachably mounted a circular base 30 having a shallow circular recess in which is rotatably carried a disc 32, the center of the disc being in line with the scale mark elements 26. As shown, the base 30 has in its bottom face a channel with undercut sides in which channel is fitted a tongue 36 with a dovetail cross-sectional edge, the fit being sufficiently snug to hold the members together frictionally. The shape and dimensions of the tongue 36 are preferably such as to facilitate the use of the ruler 20 as an attachment for the standard shipboard type parallel drafting machine in general use on naval vessels.

The ruler 20 is preferably made of a transparent plastic material such, for example, as an acrylic resin generally known as "Lucite." Among the advantages flowing from the use of this material is that by the addition of a suitable light source (not shown) to the device, a self-illuminated plotter can be had. For convenient housing of the expansible scale, the ruler may be made with a longitudinally extending cavity 40 between the bottom 42 and the top 44. A relatively narrow slot 46 through the top 44 extends along the longitudinal median of the ruler for substantially its entire length. The margins of the ruler along the edges 22 and 24 are preferably beveled as at 48 and 50 and these beveled surfaces are suitably treated to receive pencil marks readily. For this purpose these surfaces can be frosted or coated to produce the fine roughening necessary for receiving pencil marks.

Within the cavity 40 is a lazy-tongs structure consisting of a series of pairs of thin links 52 of stainless steel which intersect each other at their mid points and are pivotally connected at the points of intersection. The ends of the links of each said pair are pivotally joined respectively to ends of the adjacent pairs of links, as at 54. At the intersection point of each pair of links is a scale mark element 26 which may conveniently be in the form of a pin passing through a hole in each link at its mid point and projecting up into the slot 46 (Figure 5). Since the links 52 are all of equal length and are similarly jointed, the pins 26 are uniformly spaced apart and maintain uniform spacing when the overall length of the lazy-tongs structure is increased or diminished. Hence, the structure may be adjusted so that the distance between successive pins 26 is equal to a unit distance adopted on a chart. For convenience, the linear distance between two consecutive pins 26 can be set to one tenth of the estimated speed of a ship (over the ground), that is, the distance as represented by the chart scale which the ship is supposed to advance every six minutes. For example, if the estimated speed of the ship is 20 knots, the pins 26 are adjusted to be spaced by the equivalent of two miles on the chart scale. The pins thus represent successive positions of the ship at 6-minute intervals. To facilitate finding positions of the ship at intermediate minutes, the links 52 may have scale marks such as dots 55 which divide each link into six equal parts. Projection of these scale marks to an edge of the ruler 20 gives an indication of the ship's progress by single minutes. By laying the ruler on the chart extending in the direction of the ship's course, the ship's position at any moment can be quickly predicted, assuming that the ship maintains the same course and speed. If a check made on the ship's progress by taking bearings on landmarks or otherwise shows that the estimated speed over the ground is in error, the error can quickly be corrected by adjusting the lazy-tongs. This automatically corrects subsequent predicted positions based on the pins 26 and dots 55.

To hold the lazy-tongs structure against accidental slipping and to provide convenient means for manipulating the lazy-tongs, a friction clamp of brass parts may be mounted at two spaced points of intersection of the links, preferably at the intersection points of the first and last pairs of links in the series. At these points, instead of a short pin 26 extending up through the two links from a flat head 56, a bolt 60 which is longer is employed. A helical spring 64 rounds a portion of the bolt 60 which projects above the surface of the ruler. The upper portion of the bolt 60 is screw-threaded for engagement with a cap nut 62 and a thimble 65. The thimble is closed at its upper end except for a central hole 71 which is tapped to receive the bolt 60. The cap nut 62 bears on the top of the thimble 65 and acts as a lock nut to prevent the bolt from working loose. The thimble 65 has two ears 66 projecting down from its lower edge to engage in the slot 46 and thus to prevent its rotation. The lower edge of the thimble 65 rests on a washer 68 which has a short tubular flange adapted to fit in the lower portion of the thimble and to surround the lower portion of the spring 64. The washer 68 has two radial slots 70 therein in which slots the ears 66 engage to prevent rotation of the washer 68 as well as of the thimble. A spacing washer 72 is on the bolt immediately below the roof 44 to hold the joints 54 away from the top 44. The spring 64 is enclosed by the thimble 65 and is compressed between the upper end of the thimble and the washer 68. Hence the washer 68 is normally pressed down against the top 44 while the washer 72 is pressed upward by the bolt 60 against the under surface of the top 44. This frictional gripping action of the washers 68 and 72 which normally locks each of the ends of the lazy-tongs against movement is easily relieved by pressing manually on the caps 62. They can then be readily moved along the slot 46 to lengthen or shorten the lazy-tongs.

Other structures may be employed for variable scales. For example, as illustrated in Figures 7 and 8, an extensible helical spring 80 may be inserted in a suitable cavity in the ruler. Scale mark elements 82 are mounted on the spring at uniform intervals. The ends of the spring are secured to clamping members 84 which can be released for adjusting the length of the scale. The scale can thus be expanded or contracted without disturbing the uniformity of the spacing between successive scale marks 82.

The attachment at an end of the ruler is illustrated more in detail in Figures 9 to 11. The base 30 is circular in shape with segments slabbed off on opposite sides and is preferably of the same material as the ruler 20, that is, a transparent resin. In the bottom face of the base is a channel 86 with undercut side walls in which is fitted the tongue 36 which projects longitudinally from an end of the ruler 20. Mounted at the sides of the upper face of the base 30 are two strips 90, one of which is shown in Figure 12. A disc 92 of transparent resin rests on the members 90 but is otherwise unsupported. The disc has a compass rose on its margin, and is readily rotated about its center. The top surface of the disc is preferably frosted to receive pencil marks. To maintain the disc 92 in position over the base 30, two arcuate guide strips 94 and 96 are mounted in the same plane with the disc on the end portions of the strips 90. The disc is held down by two strips 98 the ends of which rest on the ends of the guide strips 94 and 96 and overlap segments of the disc. Suitable indicia are on the guide strips 94 and 96 to facilitate reading courses and making allowances for compass variation and deviation and also for drift in orienting the ruler 20 on a chart to indicate the heading of an aeroplane the progress of which is being checked and predicted.

I claim:

1. A navigational instrument comprising a ruler having a shallow enclosed cavity extending longitudinally therein and a longitudinally slot in the top face of said ruler opening into said cavity and extending from end to end of said ruler, a lazy tongs structure in said cavity comprising a series of cross jointed links, means for supporting and releasably locking the ends of said lazy tongs to the ruler, said means consisting of a spring pressed clamping device attached to each end of the lazy tongs and extending up through said slot, each said device being operable against the pressure of its spring to release the corresponding end of the lazy tongs for movement along the ruler.

2. A navigational instrument as in claim 1, each said device comprising a vertical bolt passing through a joint of the crossed links at one end of the lazy tongs, a head on the lower end of said bolt, a cap threaded on the upper end of said bolt, and a spring around said bolt compressed between said cap and the top of said ruler.

References Cited in the file of this patent

UNITED STATES PATENTS

| | | |
|---|---|---|
| 425,168 | Gale | Apr. 8, 1890 |
| 736,168 | Stinson | Aug. 11, 1903 |
| 1,307,188 | Dobbyn | June 17, 1919 |
| 1,876,605 | Burgett | Sept. 13, 1932 |
| 2,013,603 | Dalton | Sept. 3, 1935 |
| 2,389,303 | Forslund | Nov. 20, 1945 |
| 2,422,745 | Ost | June 24, 1947 |
| 2,449,342 | Tardif | Sept. 14, 1948 |
| 2,530,955 | Gerber | Nov. 21, 1950 |
| 2,641,844 | Worley | June 16, 1953 |

FOREIGN PATENTS

| | | |
|---|---|---|
| 282,177 | Great Britain | Dec. 22, 1927 |